United States Patent [19]

Shopsky

[11] Patent Number: 5,037,061
[45] Date of Patent: Aug. 6, 1991

[54] VALVE CONSTRUCTION AND METHOD OF MAKING THE SAME

[75] Inventor: Harvey J. Shopsky, Latrobe, Pa.

[73] Assignee: Robertshaw Controls Company, Richmond, Va.

[21] Appl. No.: 558,586

[22] Filed: Jul. 17, 1990

Related U.S. Application Data

[62] Division of Ser. No. 409,243, Sep. 19, 1989, Pat. No. 4,958,801.

[51] Int. Cl.⁵ .................. F16K 31/70; F16K 31/02
[52] U.S. Cl. ........................... 251/11; 60/528; 60/529; 29/890.124; 236/68 R; 236/87; 236/48 R
[58] Field of Search .............. 251/11; 60/528, 529; 236/68 R, 87, 48 R; 29/890.124

[56] References Cited

U.S. PATENT DOCUMENTS

| | | | |
|---|---|---|---|
| 2,409,112 | 10/1946 | Dillman | 60/528 X |
| 3,799,495 | 3/1974 | Wonn | 236/87 X |
| 4,102,496 | 7/1978 | Perl | 251/11 X |
| 4,685,652 | 8/1989 | Shopsky | 251/11 |

Primary Examiner—Arnold Rosenthal
Attorney, Agent, or Firm—Candor, Candor & Tassone

[57] ABSTRACT

A valve construction and method of making the same are provided, the valve construction comprising a housing provided with a chamber therein and with an inlet leading to the chamber and outlet leading from the chamber, a valve seat carried by the housing and leading to the outlet, a movable bimetallic lever carried by the housing and having an operating bimetallic part, a heater wire disposed in coiled relation about the operating part to heat the same when an electrical current flows through the heater wire, and a valve member carried by the bimetallic lever for opening and closing the valve seat under the control of the operating part of the bimetallic lever, the operating part of the bimetallic lever having a fastening unit operatively interconnected to the heater wire to tend to hold the heater wire in the coiled relation on the operating part of the bimetallic lever, the heater wire comprising a length of the wire doubled upon itself to define a looped end and pair of free ends adjacent each other with the looped end being part of the heater wire that is operatively interconnected to the fastening unit of the bimetallic lever, the operating part of the bimetallic lever having an opening passing therethrough and receiving the looped end of the wire therethrough whereby the opening comprises the fastening unit of the operating part of the bimetallic lever.

3 Claims, 3 Drawing Sheets

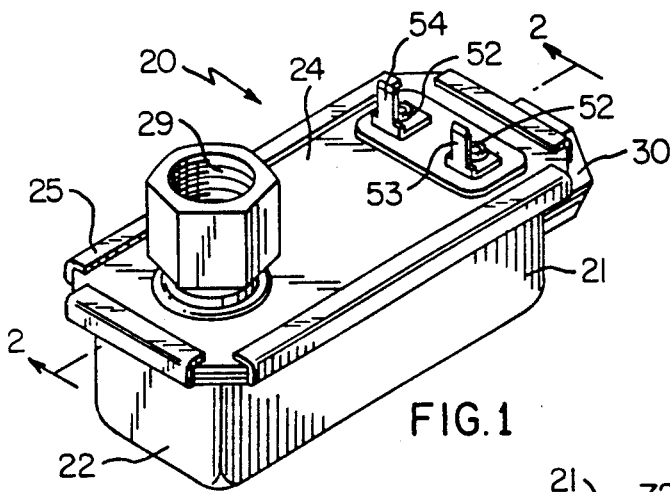
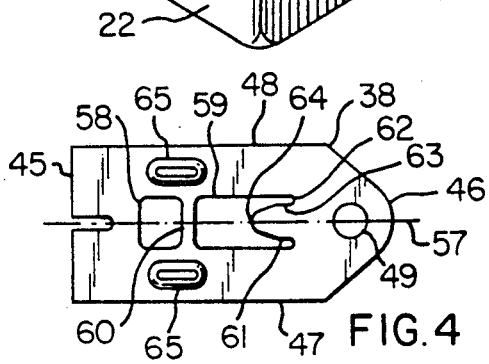
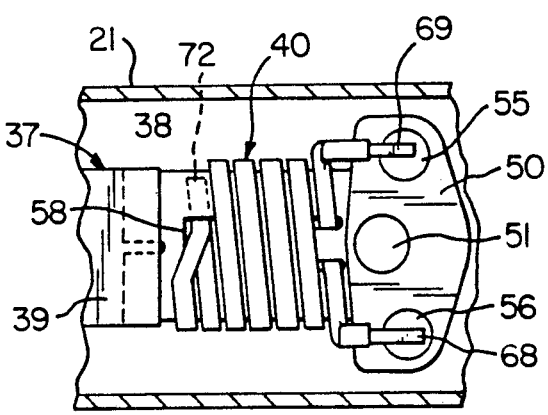
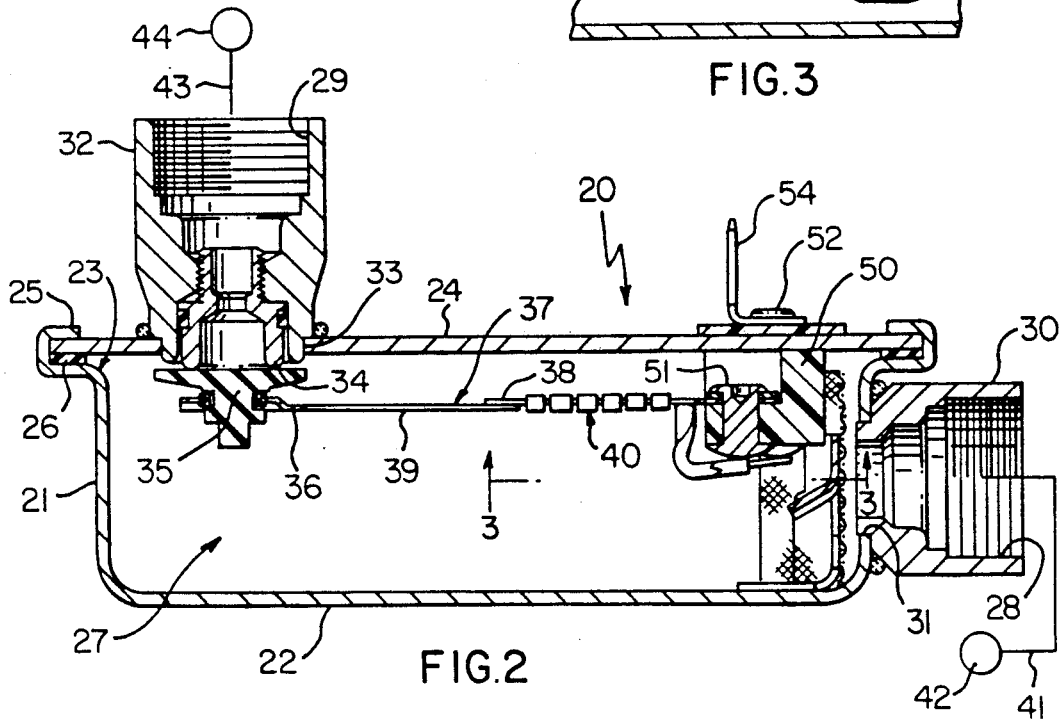

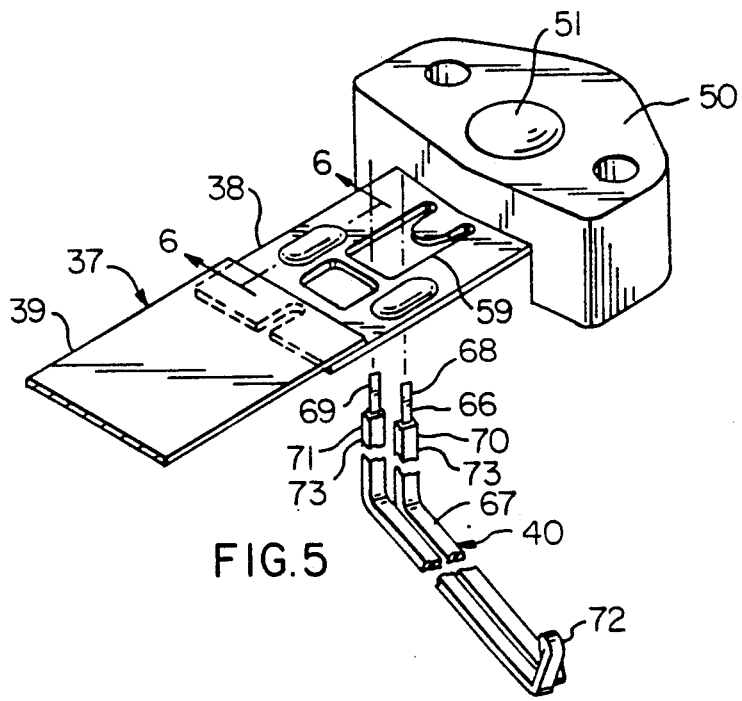
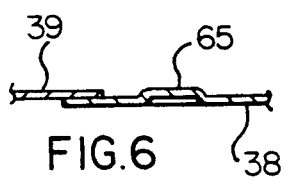
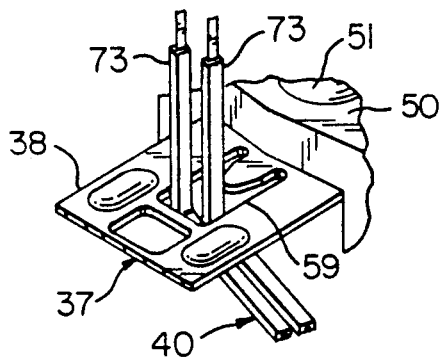
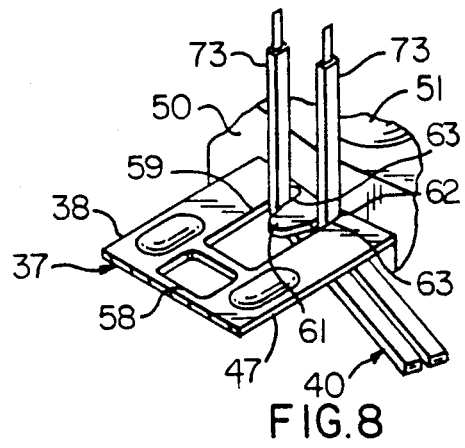
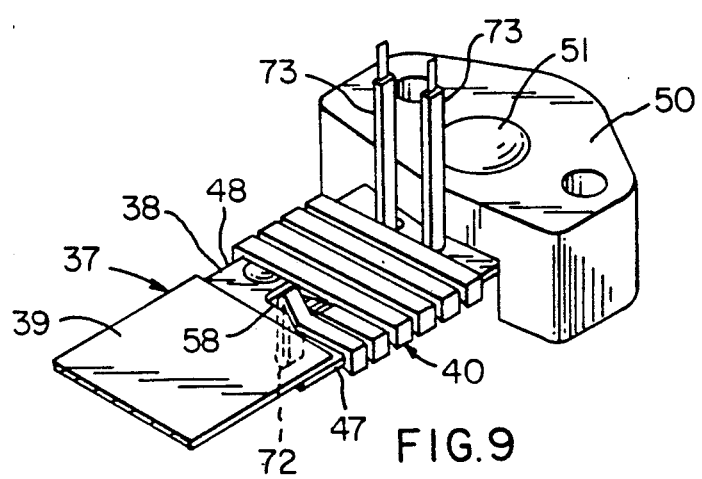

VALVE CONSTRUCTION AND METHOD OF MAKING THE SAME

CROSS REFERENCE TO RELATED APPLICATION

This application is a divisional patent application of its copending parent patent application, Ser. No. 409,243, filed Sept. 19, 1989, now U.S. Pat. No. 4,958,801 dated Sept. 25, 1990.

BACKGROUND OF THE INVENTION

1. Field of the Invention

This invention relates to a new valve construction and to a new method of making such a valve construction.

2. Prior Art Statement

It is known to provide a valve construction comprising a housing means provided with a chamber therein and with an inlet leading to the chamber and an outlet leading from the chamber, a valve seat carried by the housing means and leading to the outlet, a movable bimetallic lever means carried by the housing means and having an operating bimetallic part, a heater wire means disposed in coiled relation about the operating part to heat the same when an electrical current flows through the heater wire means, and a valve member carried by the bimetallic lever means for opening and closing the valve seat under the control of the operating part of the bimetallic lever means, the operating part of the bimetallic lever means having a fastening means operatively interconnected to the heater wire means to tend to hold the heater wire means in the coiled relation on the operating part of the bimetallic lever means, the heater wire means comprising a length of the wire means doubled upon itself to define a looped end and a pair of free ends adjacent each other with the looped end being the part of the heater wire means that is operatively interconnected to the fastening means of the bimetallic lever means. For example, see the Shopsky U.S. Pat. No. 4,685,652.

SUMMARY OF THE INVENTION

It is one feature of this invention to provide a unique bimetallic lever means for a valve construction.

In particular, it was found according to the teachings of this invention that when a heater wire means is to be coiled about an operating part of a bimetallic lever means, the same can be doubled upon itself to define a looped end and a pair of free ends adjacent each other with the looped end being inserted through an opening means in the operating part of the bimetallic lever means to hold the heater wire means in its coiled relation on the operating part of the bimetallic lever means.

In this manner, the operating part of the bimetallic lever means can comprise a substantially flat member without having any projections extending out of the plane thereof so that such part can be readily handled by automatic assembling machinery without having parts thereof stick together because of the projections thereof hanging up on adjacent parts.

Accordingly, one embodiment of this invention provides a valve construction comprising a housing means provided with a chamber therein and with an inlet leading to the chamber and an outlet leading from the chamber, a valve seat carried by the housing means and leading to the outlet, a movable bimetallic lever means carried by the housing means and having an operating bimetallic part, a heater wire means disposed in coiled relation about the operating part to heat the same when an electrical current flows through the wire means, and a valve member carried by the bimetallic lever means for opening and closing the valve seat under the control of the operating part of the bimetallic lever means, the operating part of the bimetallic lever means having a fastening means operatively interconnected to the heater wire means to tend to hold the heater wire means in the coiled relation on the operating part of the bimetallic lever means, the heater wire means comprising a length of the wire means doubled upon itself to define a looped end and a pair of free ends adjacent each other with the looped end being the part of the heater wire means that is operatively interconnected to the fastening means of the bimetallic lever means, the operating part of the bimetallic lever means having an opening means passing therethrough and receiving the looped end of the wire means therethrough whereby the opening means comprises the fastening means of the operating part of the bimetallic lever means.

Thus, it is an object of this invention to provide a new valve construction having one or more of the novel features of this invention as set forth above or hereinafter shown or described.

Another object of this invention is to provide a new method of making such a valve construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a top perspective view of the new valve construction of this invention.

FIG. 2 is an enlarged cross-sectional view taken on line 2—2 of FIG. 1 and illustrating the valve construction of this invention being disposed in a fuel control system that is schematically illustrated in FIG. 2.

FIG. 3 is a fragmentary cross-sectional view taken on line 3—3 of FIG. 2.

FIG. 4 is a top view of the operating part of the bimetallic lever means of the valve construction of FIGS. 1-3 before the heater wire means is coiled on such operating part.

FIG. 5 is a fragmentary exploded perspective view illustrating one of the steps of the method of this invention for forming the bimetallic lever means for the valve construction of FIGS. 1-3.

FIG. 6 is a fragmentary cross-section view taken on line 6—6 of FIG. 5.

FIG. 7 is a view similar to FIG. 5 and illustrates another step in the method of this invention.

FIG. 8 is a view similar to FIG. 7 and illustrates another step in the method of this invention.

FIG. 9 is a view similar to FIG. 8 and illustrates another step in the method of this invention.

DESCRIPTION OF THE PREFERRED EMBODIMENT

Figure 10:
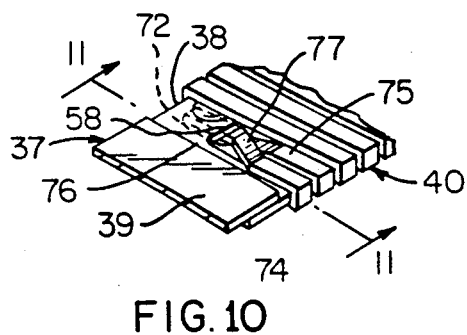
FIG. 10 is a view similar to FIG. 9 and illustrates another step in the method of this invention.

While the various features of this invention are hereinafter illustrated and described as being particularly adapted to provide a valve construction to provide a flow of gaseous fuel to a burner means of a cooking apparatus or the like, it is to be understood that the various features of this invention can be utilized singly or in various combinations thereof to provide a valve construction for supplying other types of fluid for other apparatus as desired.

Therefore, this invention is not to be limited to only the embodiment illustrated in the drawings, because the drawings are merely utilized to illustrate one of the wide variety of uses of this invention.

Referring now to FIGS. 1-3, the new valve construction of this invention is generally indicated by the reference numeral 20 and comprises a housing means 21 formed from a metallic cup-shaped housing part or member 22 having an open end 23 closed by another metallic housing part or member 24 that is held in place by a turnover flange means 25 of the housing member 22 and is sealed in place by a sealing gasket means 26 so as to provide a substantially fluid type chamber 27 in the housing means 21.

The housing means 21 has an inlet 28 leading to the chamber means 27 and an outlet 29 leading from the chamber means 27. The inlet means 28 is defined by a tubular inlet fitting 30 secured in an opening 31 in the housing part 22 and the outlet means 29 is defined by a tubular outlet fitting 32 that is secured in an opening means 33 passing through the other housing part 24.

The outlet fitting 32 carries a valve seat member 34 that is adapted to be opened and closed by a valve member 35 that is carried on an end 36 of a bimetallic lever means that is generally indicated by the reference numeral 37 and comprises an operating bimetallic part 38 secured to an ambient temperature compensating bimetallic part 39 in any suitable manner, such as by spot welding or the like.

A wire means 40 is disposed in coiled relation on the operating bimetallic part 38 in a manner hereinafter set forth so that when the same has an electrical current passing therethrough, the heater wire means 40 heats the operating part 38 in a manner to cause the same to warp and carry the valve member 35 away from the valve seat 34 so as to open the valve seat 34 to the chamber 27 in the valve construction 20 and, thus, to the inlet means 28. However, when the electrical current is not passing through the heater wire means 40, the operating bimetallic part 38 of the bimetallic lever means 37 cools and has a normal biased position as illustrated in FIG. 2 wherein the same holds the valve member 35 in its closed position against the valve seat 34 so as to prevent fluid flow between the inlet means 28 and the outlet means 29.

In this manner, the inlet means 28 of the valve construction 20 can be interconnected by a suitable conduit means 41 to a fuel source 42, such as a gaseous fuel source, and the outlet means 29 can be interconnected by a suitable conduit means 43 to an output device 44, such as a gaseous burner means of a cooking apparatus (not shown) or the like.

In general, the valve construction 20 of this invention is constructed and operates in a manner similar to the valve construction fully disclosed in the aforementioned Shopsky U.S. Pat. No. 4,685,652 whereby this patent is being incorporated into this disclosure by this reference thereto.

Therefore, since the details of the structure and the operation of the valve construction 20 of this invention are well known in the art, only the details of the valve construction 20 necessary to understand the features of this invention need to be described.

In particular, it has been previously stated that one of the features of this invention is to provide a new bimetallic lever means 37 for the valve construction 20, such new bimetallic lever means 37 having unique means for holding the heater wire 40 on the operating bimetallic part 38 thereof.

The operating part 38 of the new bimetallic lever means 37 of this invention comprises a substantially flat blank of bimetallic material, see FIG. 4, having opposed ends 45 and 46 and opposed substantially parallel side edges 47 and 48 extending between the ends 45 and 46, the end 46 having an opening 49 passing therethrough for permitting the bimetallic lever means 37 to be secured to a mounting block 50 of electrically insulating material by a suitable metallic rivet means 51 whereby the block 50, in turn, is adapted to be mounted to the housing part 24 in any suitable manner, such as by a pair of metallic rivet means 52 that also secure a pair of metallic terminals 53 and 54 to the block 50 and thereby electrically interconnect the terminals 53 and 54 to the other ends 55 and 56 of the rivet means 52 and, thus, to the opposed ends of the heater wire means 40 in a manner hereinafter set forth.

The operating bimetallic part 38 has a longitudinal axis 57 extending between the ends 45 and 46 thereof and has two substantially rectangular openings 58 and 59 formed therethrough in aligned spaced apart relation along the axis 57 whereby a relatively narrow web 60 separates the openings 58 and 59 from each other.

When the opening 59 is being formed through the operating bimetallic part 38, a tongue-like tang 61 is carved therefrom so as to extend into the opening 59 adjacent one end 62 thereof and is disposed substantially coplanar with the remainder of the operating bimetallic part 38, the tang 61 defining opposed slot means 63 on each side thereof as illustrated and having an apex 64 that is substantially arcuate and is aligned with the axis 57 as illustrated.

The operating bimetallic part 38 is embossed with reinforcing rib means 65 on each side of the opening means 58 and 59 in a manner to be parallel with and overlap the same as illustrated.

The wire means 40, as best illustrated in FIG. 5, comprises a flat member 66 formed of any suitable conductive material and being covered with any suitable electrically insulating material 67 in such a manner that opposed end portions 68 and 69 of the conductive member 66 extend out of the opposed ends 70 and 71 of the insulating material 67.

The wire means 40 is doubled upon itself so as to define a looped end 72 and a pair of free ends 73 disposed adjacent each other in offset relation so that the ends 73 can be respectively inserted upwardly through the opening means 59 in the manner illustrated in FIG. 5 to the position illustrated in FIG. 7 and then be moved toward the end 62 of the opening 59 and thereby be separated by the tongue 61 to be received in the slots 63 on opposite sides thereof as illustrated in FIG. 8, such assembly operation of the wire means 40 to the operating part 38 of the bimetallic lever means 37 either taking place when the operating bimetallic part 38 has not been assembled with the ambient compensating part 39 and/or the mounting block 50 as desired.

Figure 11:
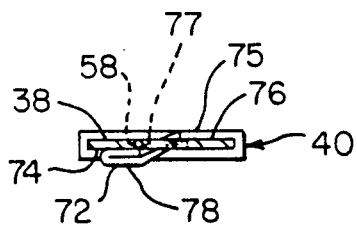
FIG. 11 is a cross-sectional view taken on line 11—11 of FIG. 10.

In any event, after the ends 73 of the wire means 40 have been disposed in the position illustrated in FIG. 8, the doubled wire means 40 is wound about the operating bimetallic part 38 from side edge 47 to side edge 48 thereof as illustrated in FIG. 9 until eventually the looped end 72 is then adapted to be pushed through the other opening means 58 of the operating bimetallic part 38 and then be bent against the under side 74 thereof in the manner illustrated in FIG. 10 and 11. In this manner, it can be seen that the looped end 72 of the wire means 40 has a first section 75 thereof disposed against one side 76 of the operating bimetallic part 38, a second section 77 thereof disposed in the opening means 58 and a third section 78 thereof disposed against the side 74 of the operating bimetallic part 38. Thus, the opening means 58 acts as a fastening means to operatively interconnect the heater wire means 40 to the operating bimetallic part 38 to hold the wire means 40 in the coiled relation on the operating part 38 of the bimetallic lever means 37.

Figure 12:
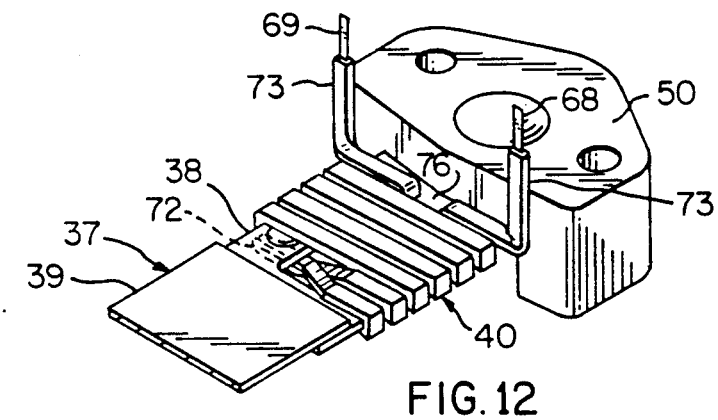
FIG. 12 is a view similar to FIG. 10 and illustrates another step in the method of this invention.
Figure 13:
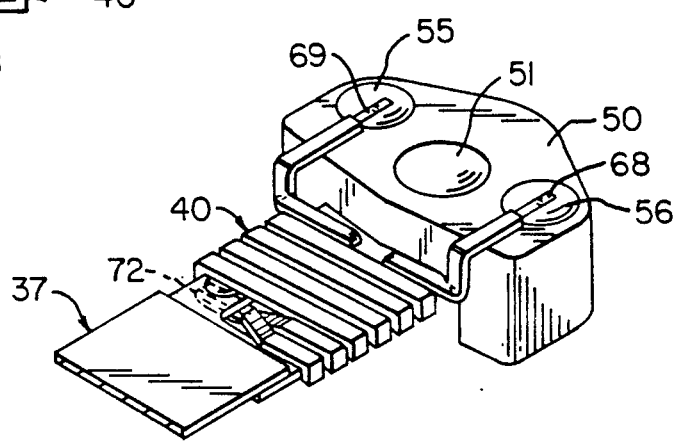
FIG. 13 is a view similar to FIG. 12 and illustrates another step in the method of this invention.

Either after the wire means 40 has been coiled on the operating bimetallic part 38 in the manner previously described or before, the ends 72 of the wire means 40 are respectively bent away from each other and down against the side 76 of the operating bimetallic part 38 in the manner illustrated in FIG. 12 and then bent at right angles relative thereto so as to place the bared ends 68 and 69 thereof against the rivet ends 56 and 55 to be electrically interconnected thereto in any suitable manner, such as by soldering or the like so that the terminals 53 and 54 will subsequently be electrically interconnected to the ends 68 and 69 of the wire means 40 so as to pass an electrical current therethrough to cause heating of the operating bimetallic part 38 of the bimetallic lever means 37 for the reasons previously set forth.

Therefore, it can be seen that it is a relatively simple method of this invention to form the bimetallic lever means 37 so as to hold the wire means 40 in a coiled manner on the operating bimetallic part 38 thereof for heating the operating bimetallic part 38 so as to open the valve member 35 away from the valve seat 34 and to permit the valve member 35 to close the valve seat 34 when an electrical current is not passing through the wire means 40 for the reasons previously set forth.

Thus, it can be seen that this invention not only provides a new valve construction, but also this invention provides a new method of making such a valve construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a bimetallic lever means for a valve construction and that has a heater wire means coiled about an operating part of said lever means to heat the same when an electrical current flows through said wire means and which is doubled upon itself so as to have a pair of free ends adjacent each other and a looped end fastened to fastening means of said operating part, the improvement comprising the steps of doubling said wire means upon itself to define said looped end and said pair of free ends adjacent each other but in offset parallel relation, inserting said free ends in said offset parallel relation into one end of a first opening through said operating part, moving said inserted free ends toward another end of said first opening so that said free ends are separated from each other by a tongue of said operating part that projects into said first opening and defines slots on each side of said tongue that respectively receive said free ends therein as said free ends are moved toward said other end of said first opening, winding the doubled part of said wire means about said operating part from one side edge thereof to another side edge thereof from said first opening toward a second opening through said operating part, then pushing said looped end on one side of said operating part through said second opening, and then bending said looped end that has passed through said second opening against the other side of said operating part whereby said second opening defines said fastening means of said operating part.

2. A method as set forth in claim 1 and including the step of respectively bending said inserted free ends of said wire means so that parts thereof are against terminal means of said lever means.

3. A method as set forth in claim 2 and including the step of soldering said parts of said wire means respectively to said terminal means.

* * * * *

Disclaimer 5,037,061—*Harvey J. Shopsky*, Latrobe, Pa. VALVE CONSTRUCTION AND METHOD OF MAKING THE SAME. Patent dated Aug. 6, 1991. Disclaimer filed May 31, 1991, by the assignee, Robertshaw Controls Co.

The term of this patent subsequent to Sept. 25, 2007, has been disclaimed.
[ *Official Gazette November 5, 1991.* ]